No. 693,526. Patented Feb. 18, 1902.
C. W. LOVE.
GRAIN DRILL, DISK, AND HOE.
(Application filed July 13, 1901.)
(No Model.)
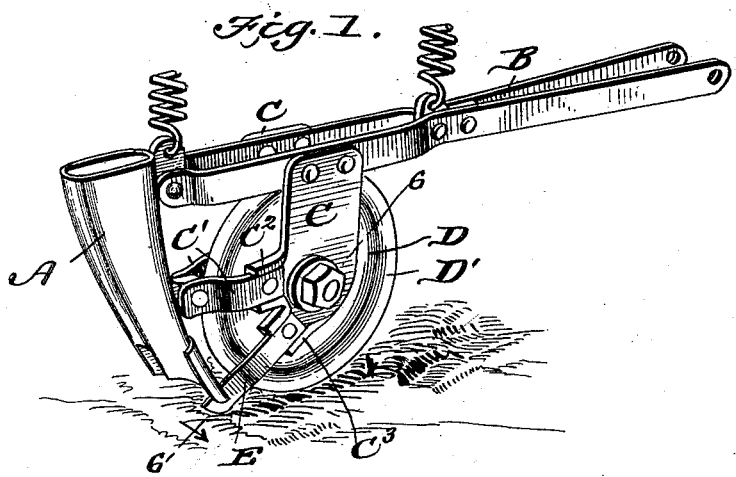
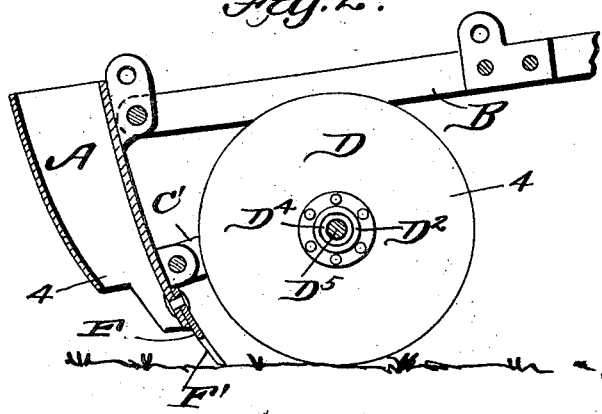
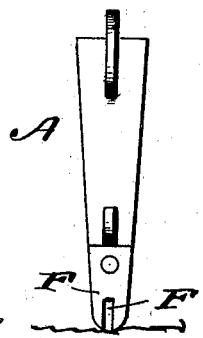
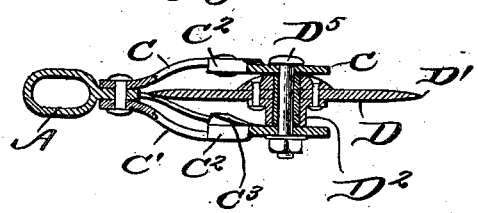
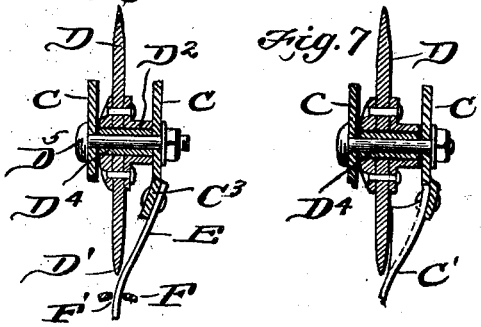
Inventor
Charles W. Love
Witnesses
By
Attorneys
THE NORRIS PETERS CO., PHOTO-LITHO., WASHINGTON, D. C.

UNITED STATES PATENT OFFICE.

CHARLES W. LOVE, OF NEW ATHENS, OHIO.

GRAIN-DRILL, DISK, AND HOE.

SPECIFICATION forming part of Letters Patent No. 693,526, dated February 18, 1902.

Application filed July 13, 1901. Serial No. 68,247. (No model.)

*To all whom it may concern:*

Be it known that I, CHARLES W. LOVE, a citizen of the United States, residing at New Athens, in the county of Harrison and State of Ohio, have invented a new and useful Grain-Drill, Disk, and Hoe, of which the following is a specification.

This invention relates to grain-drills, and more particularly to a colter attachment adapted to be used in connection with the drill-tube.

The object of the invention is to provide a colter-disk for opening or dividing the ground prior to the introduction of the drill-hoe; and a still further object is to provide an attachment to prevent grass, weeds, or any obstacle passing up between the colter-disk and drill-tube.

With these objects in view the invention consists, essentially, in arranging a colter-disk in advance and adjacent to the drill-tube, arranging a bifurcated hoe or tooth upon the end of the drill-tube, and attaching the cutter-bar adjacent to the colter-disk, the free end thereof resting in the bifurcation of the hoe or tooth for the purpose of preventing anything passing between the colter and drill-tube.

The invention consists also in certain details of construction and novelties of combination, all of which will be fully described hereinafter and pointed out in the claims.

In the drawings forming part of this specification, Figure 1 is a perspective view showing the practical application of my invention. Fig. 2 is a longitudinal sectional view. Fig. 3 is a front elevation of the drill-tube with hoe or tooth attached. Fig. 4 is a section on the line 4 4 of Fig. 2. Fig. 5 is an enlarged detail sectional view of the colter-disk. Fig. 6 is a section on the line 6 6 of Fig. 1. Fig. 7 is a section illustrating a slight modification.

Referring to the drawings, A indicates the ordinary drill-tube, attached, as usual, to the parallel supporting-beams B. Depending journal-brackets C are attached to the beams B, and between these journal-brackets is arranged the colter-disk D, the edges D' of which are sharpened to cut or divide the ground through which the colter rolls. The brackets C are so arranged with reference to the ends of the beams B that the colter will rest very close to the drill-tube. A sleeve $D^2$ is riveted to one side of the disk D and a collar $D^3$ to the opposite side, and a bearing-sleeve $D^4$ is located in the said sleeve and collar and the central opening of the disk. The bolt $D^5$ passes through the said sleeve and also through the journal-brackets C, the purpose of the sleeve $D^4$ being to take the strain or friction off the disk. Bracket-arms C' connect the journal-brackets C to the drill-tube A, rearwardly-extending guide-lugs $C^2$ being provided for the attachment of the said bracket-arms, and the depending guide-lug $C^3$ is also formed upon the lower edge of the journal-brackets, and to this depending lug is attached a cutter-bar E, the lower end of which is curved inwardly to bring it into alinement with the edge of the colter-disk, said end resting in the slot or bifurcation F' of the drill tooth or hoe F, secured upon the end of the drill-tube. This cutter bar or arm E prevents grass, dirt, or other obstacles passing up between the colter-disk and drill-tube. By means of this attachment, which can be used in connection with any grain-drill, I am enabled to plant or drill in any kind of ground, and the device can also be used upon the hillside equally as well as upon a level surface. The hoe and cutter-bar are made detachable, so they can be removed when desired for the purpose of sharpening. If desired, the bracket-arms C' can be arranged adjacent to the colter-disk for the purpose of scraping or cleaning the sides of the same.

Having thus fully described my invention, what I claim as new, and desire to secure by Letters Patent, is—

1. The combination with a drill-tube having a bifurcated tooth or hoe, of a colter-disk arranged in advance of the drill-tube and adjacent thereto, and a cutter-bar secured at its upper end, and having its lower end arranged in the bifurcation of the drill hoe or tooth, substantially as described.

2. The combination with the drill-tube having the bifurcated tooth or hoe, of the journal-brackets connected with the said drill-tube, the colter-disk arranged between the journal-brackets, and the cutter bar or arm secured at its upper end to one of the brackets and the lower end of said bar resting in the bifurcation of the tooth or hoe, substantially as described.

3. The combination with the drill-tube and supporting-beams, of the journal-brackets attached to the said beams, the colter-disk journaled between said brackets, the bracket-arms connecting the drill-tubes and bracket, the bifurcated hoe or tooth, and the cutter bar or arm attached to one of the journal-brackets, the lower end of said bar or arm resting in the bifurcation of the tooth or hoe, substantially as set forth.

CHARLES W. LOVE.

Witnesses:
J. B. WILLIAMSON,
DAVID MCCALL.